United States Patent [19]
Gray

[11] 3,777,786
[45] Dec. 11, 1973

[54] ENTRANCE STRUCTURE FOR A LIQUID CONDUIT

[76] Inventor: Ira M. Gray, Route 2, Stamping Ground, Ky. 40379

[22] Filed: July 24, 1972

[21] Appl. No.: 274,575

[52] U.S. Cl. .................................. 138/109, 61/16
[51] Int. Cl. ............................................. F16l 9/00
[58] Field of Search .................. 138/109, 100, 102, 138/120, 155; D44/29 K; 61/16

[56] References Cited
UNITED STATES PATENTS
1,620,089  3/1927  Fischer ................................. 61/16
D205,678  9/1966  Williams .......................... D44/29 K Primary Examiner—George E. Lowrance
Assistant Examiner—Steven M. Pollard
Attorney—Frank C. Leach, Jr.

[57] ABSTRACT

An entrance structure for a storm sewer pipe is designed so that the storm sewer pipe has full flow therethrough when the height of the water at the inlet of the entrance structure is equal to or greater than the height of the inlet of the storm sewer pipe.

10 Claims, 9 Drawing Figures

PATENTED DEC 11 1973 3,777,786

ENTRANCE STRUCTURE FOR A LIQUID CONDUIT

In the flow of liquid through a conduit such as a storm sewer pipe, for example, a critical problem has been to utilize the entire area of the passage extending through the storm sewer pipe for flow of water. When the height of the water becomes equal to or greater than the height of the storm sewer pipe at its entrance, it would seem that the passage in the storm sewer pipe would be completely filled. However, this does not occur for moderate to steep slopes and a portion (approximately one-third) of the passage of the storm sewer pipe does not carry water.

One is required to utilize a storm sewer pipe having an area capable of carrying a specific quantity of water. Because of the inability of the storm sewer pipe to have its passage completely filled, it has been necessary to use a storm sewer pipe of a larger area than it would be required if the passage of the storm sewer pipe were capable of being competely filled with water.

Various means for increasing the flow of liquid through a conduit have previously been suggested. For example, tapered inlets have been proposed. While these enable the conduit to carry more water than if a standard headwall is employed with the storm sewer pipe, there is still a significant portion of the passage not filled when the level of water is higher than the height of the storm sewer pipe at its entrance.

The use of a plate or hood extending forwardly of the entrance of the storm sewer pipe and at the top of the storm sewer pipe also has been proposed. However, supports for the plate catch trash and the like. This trash can eventually partially block the entrance to significantly reduce the flow of water through the storm sewer pipe. While the plate is not capable of enabling the storm sewer pipe to be completely filled, it is significant improvement over a storm sewer pipe having only a standard headwall.

The inability to utilize the full area of the passage in the storm sewer pipe is deemed to be caused by a vortex, which is formed at the entrance to the storm sewer pipe by the standard headwall, for example. The previously mentioned plate, for example, reduces the formation of the vortex.

The present invention satisfactorily overcomes the foregoing problems by replacing the headwall with an entrance structure in which the vortex is prevented from forming. It is believed that the entrance structure of the present invention prevents the vortex from forming since there is no abrupt change in the path of a water particle from the top of the surface to the top of the storm sewer pipe. That is, the entrance structure uses a streamlined flow arrangement so that there is no area of low pressure as is produced by the abrupt angle at the face of the standard headwall.

Accordingly, the introduction of any air into the entrance of the storm sewer pipe which uses the entrance structure of the present invention does not cause collapse of the water within the pipe as occurs when a vortex is present. Therefore, the entrance structure of the present invention enables the storm sewer pipe to have its passage completely filled when the level of the water is higher than the height of the entrance of the storm sewer pipe.

An object of this invention is to provide an entrance structure for a liquid conduit to cause full flow through the liquid conduit when the height of the liquid at the entrance of the conduit is equal to or greater than the height of the inlet of the conduit.

Another object of this invention is to provide an easily constructed entrance structure for a liquid conduit.

Other objects of this invention will be readily perceived from the following description, claims, and drawings.

This invention relates to an entrance structure for a liquid conduit having a passage of circular cross section. The entrance structure includes a hollow member secured to the liquid conduit and having a passage extending with its outlet having the same area and configuration as the inlet of the liquid conduit passage. The hollow member passage has its inlet of a greater area than its outlet with the area of the passage decreasing substantially progressively from its inlet to its outlet. The hollow member passage has at least the upper half of its periphery formed by a circular arc with its center being axially aligned with the center of the liquid conduit passage.

The attached drawings illustrate a preferred embodiment of the invention, in which.

Figure 1:
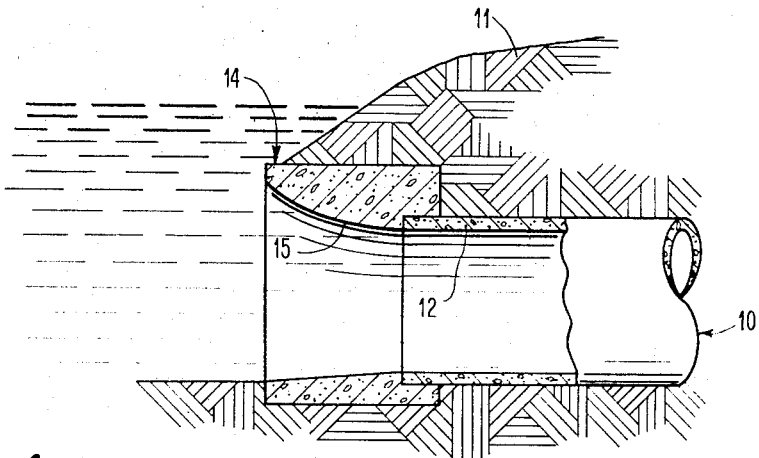
FIG. 1 is a side sectional view of a storm sewer pipe having the entrance structure of the present invention.

Referring to the drawings and particularly FIG. 1, there is shown a cylindrical conduit 10 such as a storm sewer pipe, for example, having a circular cross section and disposed beneath an earth fill 11. The conduit 10 has a passage 12 extending therethrough of circular cross section with a diameter D.

An entrance structure 14 is secured to the conduit 10 and has a passage 15 extending therethrough with its outlet 16 (see FIGS. 2 and 3) having the same area as the area of the passage 12 in the conduit 10. The outlet 16 is circular and has the diameter D. the passage 15 of the entrance structure 14 has its inlet 17 of greater area than the area of the outlet 16 of the passage 15 with the area of the passage 15 increasing substantially progressively from its outlet 16 to its inlet 17.

The entrance structure 14 is formed of concrete and secured to the conduit 10 by a mold, which has the desired shape to give the desired configuration to the passage 15. The mold may be formed of any suitable material such as fiberglass, for example, in forming the entrance structure 14.

In order to obtain the most efficient flow through the passage 15 of the entrance structure 14, it is necessary for various segments of the passage 15 to have specific relationships to each other. However, these relationships can be varied within certain limits and still obtain efficient flow through the conduit 10 although the conduit 10 would not be completely filled. For example, if the length of the passage 15 in the entrance structure 14 is reduced 10% from its preferred length, the flow efficiency becomes approximately 97 percent rather than 100 percent. If the length of the passage 15 of the entrance structure 14 is reduced 50% from its preferred length, then the efficiency will be approximately 70 percent. With this reduction, the entrance structure 14 is only slightly more effective than a standard headwall, for example, so that the entrance structure 14 would cease to be of value.

The preferred length of the passage 15 of the entrance structure 14 is equal to the diameter of the passage 12 in the conduit 10. Thus, the preferred length of the passage 15 is D.

Figure 9:
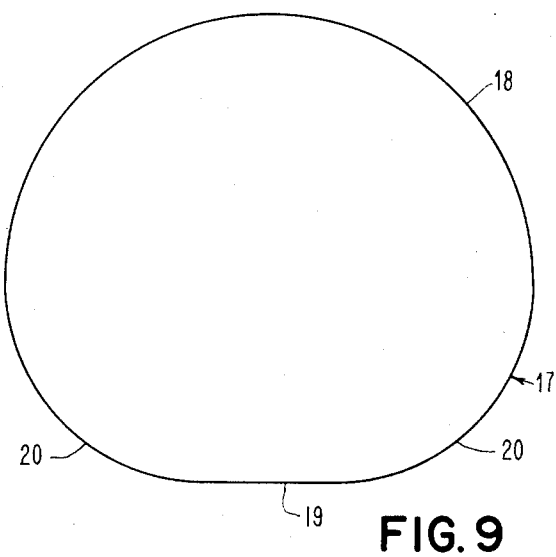

The periphery of the passage 15 is circular at its outlet 16 (see FIG. 3) while its inlet 17 (see FIG. 9) has a first circular arc portion 18 and a non-circular or flat portion 19 with a pair of second circular arc portions 20, which have the same radius but a smaller radius than the radius of the circular arc portion 18, extending between each end of the circular arc portion 18, which is semicircular, and each end of the flat portion 19. Between the outlet 16 and the inlet 17, the periphery of the passage 15 changes in a smooth streamline.

Figure 4:
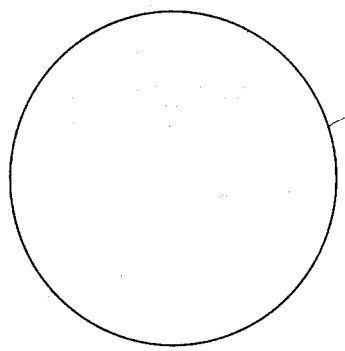
Figure 5:
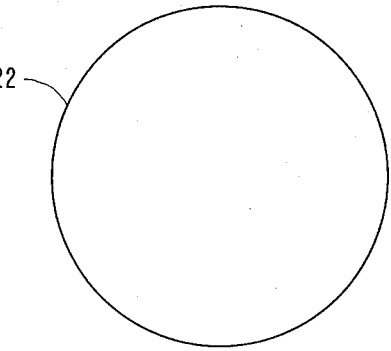
Figure 6:
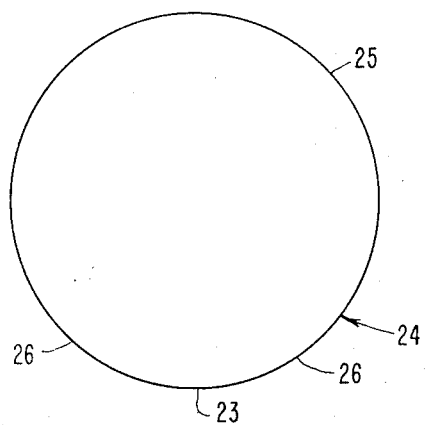

The periphery of the passage 15 is still circular at section 21 (see FIG. 4) and at section 22 (see FIG. 5). The periphery of the passage 15 has a small flat or non-circular portion 23 at its section 24 (see FIG. 6) while the remainder of the periphery of the passage 15 at its section 24 is a first circular arc portion 25, which is a semi-circle, and a pair of second circular arc portions 26, which are the same radius but a smaller radius than the radius of the first circular arc portion 25, connecting each end of the first circular arc portion 25 to one of the ends of the flat portion 23.

Figure 7:
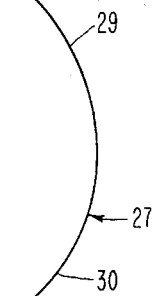

At its section 27 (see FIG. 7), the periphery of the passage 15 is formed by a non-circular or flat portion 28, a first circular arc portion 29, and a pair of second circular arc portions 30. As seen from FIGS. 6 and 7, the non-circular portion 28 of the section 27 is wider than the non-circular portion 23 of the section 24.

The second circular arc portions 30 have the same radius, which is smaller than the radius of the first circular arc portion 29. Each of the second circular arc portions 30 connects one end of the first circular arc portion 29, which is a semi-circle, to one end of the flat portion 28.

Figure 8:
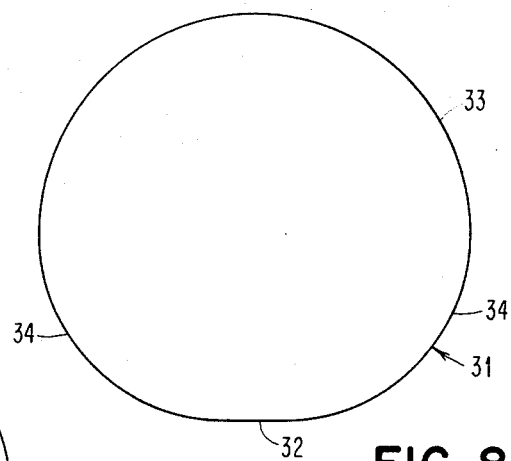

At its section 31 (see FIG. 8), the periphery of the passage 15 has a non-circular or flat portion 32, a first circular arc portion 33, and a pair of second circular arc portions 34.

The second circular arc portions 34 of the section 31 have the same radius, which is smaller than the radius of the first circular arc portion 33. Each of the second circular arc portions 34 connects one end of the first circular arc portion 33, which is a semi-circle, to one end of the flat portion 32. The non-circular portion 32 is wider than the non-circular portion 28 but smaller than the non-circular portion 19. Thus, the flat portion of the passage 15 progressively decreases from its inlet 17.

With the length of the passage 15 being equal to the diameter D of the passage 12 of the conduit 10, the section 21 is disposed a distance D/6 from the outlet 16 of the passage 15 as measured along a longitudinal axis passing through the center of the passage 12 of the conduit 10. The section 22 is disposed a distance of D/4 from the section 21 and a distance of D/4 from the section 24.

The section 27 is disposed a distance of D/6 from the section 24 and a distance of D/12 from the section 31. The inlet 17 of the passage 15 is at a distance of D/12 from the section 31 of the passage 15.

Figure 2:
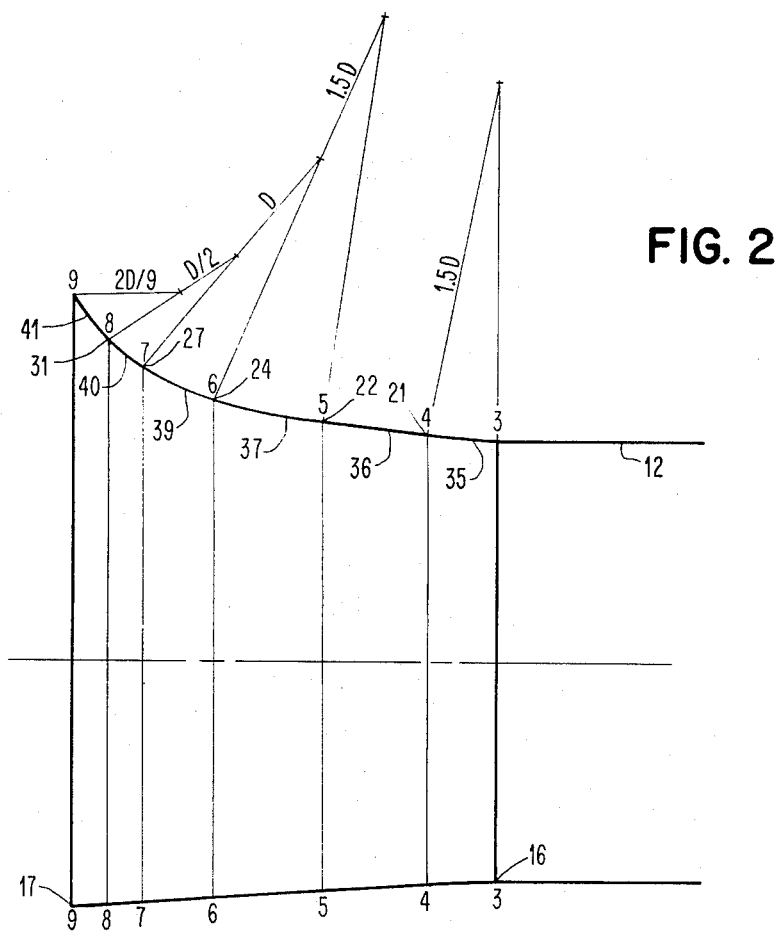
FIG. 2 is a schematic view showing the relationship of the passage in the entrance structure and its cooperation with the storm sewer pipe.
Figure 3:
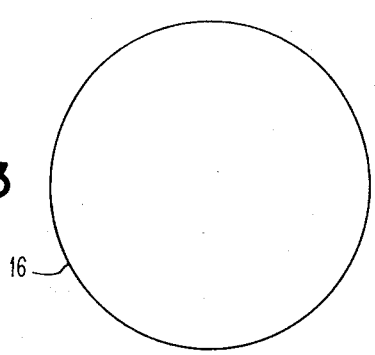
FIGS. 3-9 are schematic end views of portions of the passage of the entrance structure of the present invention and taken along lines 3—3 to 9—9, respectively, of FIG. 2.

Between the outlet 16, which as a radius of 0.5D, and the section 21, which has a radius of 0.5092D, the periphery of the passage 15 increases along a curve 35 (see FIG. 2). The curve 35 is generated by a radius of curvature of 1.5D.

Between the section 21 and the section 22, the periphery of the passage 15 increases along a straight line 36. The section 22 has a radius of 0.53695D.

The first circular arc portion 25 (see FIG. 6) of the section 24 is formed with a radius of 0.58651D while each of the second circular arc portions 26 has a radius of 0.57407D, so that the non-circular or flat portion 23 of the section 24 is located a distance of 0.57407D from a longitudinal axis passing through the center of the passage 12 of the conduit 10. Between the first circular arc portion 25 and the second circular arc portions 26 of the section 24 and the same corresponding portion of the section 22, a curve 37 (see FIG. 2) extends and has a radius of curvature of 1.5D. The flat portion 23 of the section 24 tapers toward the section 22 and terminates prior to the section 22.

The first circular arc portion 29 (see FIG. 7) of the section 27 is formed with a radius of 0.65113D while each of the second circular arc portions 30 has a radius of 0.59259D so that the flat portion 28 of the section 27 is located a distance of 0.59259D from a longitudinal axis passing through the center of the passage 12 of the conduit 10. A curve 39 (see FIG 2) extends between the first circular arc portion 29 of the section 27 and the corresponding first circular arc portion 25 of the section 24 and between the second circular arc portions 30 of the section 27 and the corresponding second circular arc portions 26 of the section 24 and has a radius of curvature of D. The flat portion 32 (see FIG. 8) of the section 32 extends to the flat portion 28 (see FIG. 7) of the section 27 in a reducing relation.

The section 31 has the first circular arc portion 33 formed with a radius of 0.739D while each of the second circular arc portions 34 has a radius of 0.60185D so that the flat portion 32 is located at a distance of 0.60185D from a longitudinal axis passing through the center of the passage 12 of the conduit 10. A curve 40 (see FIG. 2) extends between the first circular arc portion 29 of the section 27 and the first circular arc portion 33 of the section 31 and between the second circular arc portions 30 of the section 27 and the second circular arc portions 34 of the section 31. The curve 40 has a radius of curvature of D/2. The flat portion 32 of the section 31 extends toward the flat portion 28 of the section 27 in a reducing relation.

The inlet 17 of the passage 15 has the first circular arc portion 18 (see FIG. 9) formed with a radius of 0.84126D while each of the second circular arc portions 20 has a radius of 0.61111D so that the flat portion 19 is disposed 0.61111D from a longitudinal axis passing through the center of the passage 12 of the conduit 10. A curve 41 (see FIG. 2) extends between the first circular arc portion 33 of the section 31 and the first circular arc portion 18 of the inlet 17 and between the second circular arc portions 34 of the section 31 and the second circular arc portions 20 of the inlet 17. The curve 41 has a radius of curvature of 2 D/9. The flat portion 19 of the inlet 17 extends toward the flat portion 32 of the section 31 in a reducing relation.

Accordingly, the periphery of the passage 15 of the entrance structure 14 is circular from its outlet 16 for 5/12 of the length of the passage 15 with an increasing radius. Then, the remainder of the length of the passage 15 to its inlet 17 is formed with an increasing flat or non-circular portion along the bottom of the periphery with the remainder of the periphery being circular with arc portions of two different radii at each section and the radii increasing at each section.

The non-circular or flat portion of the periphery of the passage 15 is employed to reduce the amount of water that would stand at the inlet 17 to the passage 15 if the inlet 17 were circular. Furthermore, it is not necessary for the portion of the periphery of the passage 15 to be flat as other non-circular portions such as a portion of an ellipse, for example, could be employed, if desired. It should be understood that a slight amount of water will still stand at the inlet 17 of the passage 15 but it is significantly reduced through using the non-circular portion at the bottom of the passage 15.

While the passage 15 of the entrance structure 14 has been shown and described as having a specific relationship between each of the various sections of the passage 15, it should be understood that the specific dimensions are not necessary for satisfactory operation of the entrance structure 14. That is, it is only necessary that the area of the passage 15 decrease substantially progressively from the inlet 17 to the outlet 16. The particular radii of curvatures and straight lines and the specific distances therebetween give the most desired result. However, the passage 15 will function to maintain the conduit 10 substantially filled with slight deviations from the specific dimensional relationships.

It should be understood that each of the circular sections 21 and 22 of the periphery of the passage 15 and the circular outlet 16 of the passage 15 has its center on a longitudinal axis passing through the center of the passage 12 of the conduit 10 so that its center is axially aligned with the center of the passage 12 of the conduit 10. Likewise, the first circular arc portion of each of the sections 24, 27, and 31 of the periphery of the passage 15 and of the inlet 17 of the passage 15 has its center on the longitudinal axis passing through the center of the passage 12 of the conduit 10 so that its center is axially aligned with the center of the passage 12 of the conduit 10.

It also should be understood that the center for each of the second circular arc portions of each of the sections 24, 27, and 31 of the periphery of the passage 15 and the inlet 17 of the passage 15 is at the intersection of a line extending from the end of the second circular arc portion adjacent the end of the first circular arc portion toward the center of the first circular arc portion and a line extending from the end of the second circular arc portion adjacent the flat portion and perpendicular to the flat portion. Thus, the center of each of the second circular arc portions is located at the perpendicular junction of its two outside radii.

An advantage of this invention is that it reduces the cost for a storm sewer since smaller diameter pipes can carry the same quantity of liquid. Another advantage of this invention is that it enables a storm sewer pipe to carry a larger quantity of liquid.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. An entrance structure for a liquid conduit having a passage of circular cross section, said entrance structure including a hollow member secured to the liquid conduit and having a passage extending therethrough, said hollow member passage having its outlet in a plane substantially perpendicular to the longitudinal axis of the liquid conduit passage and its inlet in a plane substantially parallel to the plane containing its outlet, said hollow member passaging having its outlet with a greater area than its outlet, said hollow member passage having its cross sectional area decrease substantially progressively in a non-linear relation from its inlet to its outlet, said hollow member passage having at least the upper half of its periphery formed by a circular arc with its center being axially aligned with the longitudinal axis of the liquid conduit passage, the periphery of said hollow member passage having a non-circular portion adjacent its bottom from its inlet toward its outlet for a distance greater than one half of the length of said hollow member passage, the periphery for the remainder of the length of said hollow member passage being circular and extending from its oulet toward its inlet for a distance greater than one-third of the length of said hollow member passage, and the non-circular portion of the periphery of said hollow member passage being smaller than the diameter of the liquid conduit passage.

2. The entrance structure according to claim 1 in which th circular portion of the periphery of said hollow member passage extends from its outlet toward its inlet for 5/12 of the length of said hollow member passage.

3. The entrance structure according to claim 2 in which the non-circular portion of the periphery of said hollow member passage progressively decreases from the inlet of said hollow member passage.

4. The entrance structure according to claim 3 in which said hollow member passage has a length equal to the diameter of the liquid conduit passage.

5. The entrance structure according to claim 1 in which said hollow member passage has a length equal to the diameter of the liquid conduit passage.

6. The entrance structure according to claim 1 in which said hollow member passage has a length no greater than the diameter of the liquid conduit passage.

7. The entrance structure according to claim 1 in which any portion of the length of the periphery of said hollow member passage having the non-circular portion includes a first arc of a first radius and forming a semicircle, a second arc of a second radius beginning at one end of the first arc, a third arc of the second radius beginning at the other end of the first arc, the non-circular portion connecting the other ends of the second and third circular arcs to each other, and the first radius being larger than the second radius.

8. The entrance structure according to claim 7 in which the non-circular portion connecting the ends of the second and third arc is a flat portion.

9. The entrance structure according to claim 4 in which any portion of the length of the periphery of said hollow member passage having the non-circular portion includes a first arc of a first radius and forming a semicircle, a second arc of a second radius beginning at one end of the first arc, a third arc of the second radius beginning at the other end of the first arc, the non-circular portion connecting the other ends of the second and third circular arcs to each other, and the first radius being larger than the second radius.

10. The entrance structure according to claim 9 in which the non-circular portion connecting the ends of the second and third arc is a flat portion.

* * * * *